US012761354B2

(12) United States Patent
Yang et al.

(10) Patent No.: US 12,761,354 B2
(45) Date of Patent: Oct. 13, 2026

(54) MINIATURIZED WIDE-RANGE LASER RANGE FINDER

(71) Applicant: JINHUA LANHAI PHOTOELECTRICITY TECHNOLOGY CO.,LTD., Jinhua (CN)

(72) Inventors: Shanshan Yang, Jinhua (CN); Xiangwei Qian, Jinhua (CN); Chongqiu Liu, Jinhua (CN); Yiqun Fan, Jinhua (CN)

(73) Assignee: JINHUA LANHAI PHOTOELECTRICITY TECHNOLOGY CO., LTD., Jinhua (CN)

( * ) Notice: Subject to any disclaimer, the term of this patent is extended or adjusted under 35 U.S.C. 154(b) by 817 days.

(21) Appl. No.: 18/306,981

(22) Filed: Apr. 25, 2023

(65) Prior Publication Data

US 2023/0341552 A1 Oct. 26, 2023

(30) Foreign Application Priority Data

Apr. 25, 2022 (CN) ......................... 202210439968.9

(51) Int. Cl.

| | |
|---|---|
| ***G01S 17/10*** | (2020.01) |
| ***G01S 7/481*** | (2006.01) |
| ***G01S 7/4865*** | (2020.01) |
| ***G01S 7/51*** | (2006.01) |
| ***G02B 13/00*** | (2006.01) |
| ***G02B 23/04*** | (2006.01) |
| ***G02B 25/00*** | (2006.01) |

(52) U.S. Cl.

CPC ............ *G01S 17/10* (2013.01); *G01S 7/4814* (2013.01); *G01S 7/4865* (2013.01); *G01S 7/51* (2013.01); *G02B 13/006* (2013.01); *G02B 13/0065* (2013.01); *G02B 23/04* (2013.01); *G02B 25/001* (2013.01)

(58) Field of Classification Search

CPC .................................. G01S 7/481; G02B 7/04

See application file for complete search history.

(56) References Cited

U.S. PATENT DOCUMENTS

2010/0110568 A1* 5/2010 Margolis .................. G02B 7/04 359/744

2018/0128903 A1* 5/2018 Chang ................... G01S 7/4816

FOREIGN PATENT DOCUMENTS

CN 111239751 A * 6/2020 ........... G01S 7/4817

* cited by examiner

*Primary Examiner* — Helal A Algahaim
*Assistant Examiner* — Clara G Clinton
(74) *Attorney, Agent, or Firm* — HOWARD M COHN and Associates, LLC

(57) ABSTRACT

The present invention discloses a miniaturized wide-range laser range finder which belongs to the technical field of laser range finding, and comprises a monocular telescopic system, a laser emitting system and a laser receiving system, wherein the monocular telescopic system comprises an objective lens system, a focus adjusting system, a beam splitting prism group, a transparent liquid crystal display unit and an eyepiece system through which visible light passes in sequence; the laser emitting system comprises a laser light source and an emitting lens; the laser receiving system comprises an objective lens system, a focus adjusting system, a beam splitting prism group, a receiving lens, a light filter and a laser receiver through which a laser reflection light signal passes in sequence.

7 Claims, 5 Drawing Sheets

MINIATURIZED WIDE-RANGE LASER RANGE FINDER

TECHNICAL FIELD

The present invention relates to the technical field of laser range finding, and more particularly to a miniaturized wide-range laser range finder.

BACKGROUND

Laser range finders mainly include pulse-type laser range finders, phase-type laser range finders and trigonometric laser range finders. A telescope laser range finder is most common in pulse-type laser range finders, comprising a telescope and a laser transceiving module, and mainly used for laser range finding of medium and long distances. The process of pulse-type laser range finding is: laser emitted by the range finder is reflected by an object to be measured and then received by the range finder, the round-trip time of the laser is recorded by the range finder at the same time, half of the product of the speed of light and the round-trip time is the distance between the range finder and the object to be measured, and then the distance information is displayed on the focal plane of the eyepiece lens and is received and read by an observer.

In practical monocular telescope range finder products, a number of operating limitations are imposed due to the system itself, such as the inability to see objects at a short distance clearly. At present, the telescope range finders on the market are mainly used for laser range finding of medium and long distances, the minimum observing distance is generally greater than 5 meters, and the volume is large, making the telescope range finders inconvenient to carry. The measuring distance is related to the design of the objective lens system. A fixed monocular system cannot meet the needs of both short and long distance observation at the same time, which greatly limits the measuring range of the range finders. The monocular telescope range finders on the market often sacrifice the short distance observation effect to satisfy the long distance observation function. Some binocular telescope range finders have a focus adjusting function, but are large in volume and inconvenient to carry.

Therefore, the problem to be urgently solved by those skilled in the art is how to provide a miniaturized laser range finder capable of meeting the needs of both short and long distance observation at the same time.

SUMMARY

In view of this, the present invention provides a miniaturized wide-range laser range finder which is used to expand the application range of the laser range finder, so as to make the minimum observing distance of the monocular telescope range finder reach 2 meters, and the range of the observing distance of the monocular telescope range finder expanded to 2-2000 meters.

To achieve the above purpose, the present invention adopts the following technical solution:

A miniaturized wide-range laser range finder, comprising a monocular telescopic system, a laser emitting system and a laser receiving system, wherein the monocular telescopic system comprises an objective lens system, a focus adjusting system, a beam splitting prism group, a transparent liquid crystal display unit and an eyepiece system through which visible light passes in sequence; the laser emitting system comprises a laser light source and an emitting lens; the laser receiving system comprises an objective lens system, a focus adjusting system, a beam splitting prism group, a receiving lens, a light filter and a laser receiver through which a laser reflection light signal passes in sequence.

Preferably, the focus adjusting system comprises a focus adjusting negative lens which is located between the objective lens system and the beam splitting prism group, and moved forward and backward along the optical axis direction of the monocular telescopic system, so that the focal planes of the laser range finder when used for observing objects at a distance of 2 meters and a distance of 2000 meters can be kept in the same position of the system by moving the focus adjusting negative lens.

Preferably, the monocular telescopic system and the laser receiving system share the same objective lens system, focus adjusting system and beam splitting prism group, so as to reduce the volume of the laser range finder.

Preferably, the transparent liquid crystal display unit is located in the focal plane of the eyepiece system, so that when an object to be measured is seen clearly through the eyepiece system, the distance information displayed by the transparent liquid crystal display unit can also be seen clearly.

Preferably, the beam splitting prism group comprises a cemented prism and a roof half penta prism;

The cemented prism comprises an isosceles prism and a compensating prism, and the isosceles prism comprises a laser input and reflection surface, a reflection and output surface, and a first beam splitting surface which are connected in sequence; the compensating prism comprises a second beam splitting surface, a laser reflection surface and a laser output surface which are connected in sequence; and the first beam splitting surface of the isosceles prism is overlapped with the second beam splitting surface of the compensating prism;

The roof half penta prism comprises a roof light input and reflection surface, a roof top surface and a roof light output surface;

The laser input surface of the isosceles prism is arranged in parallel with the roof light output surface of the roof half penta prism. Through the design of the beam splitting prism group, the volume of the laser range finder is further reduced and miniaturization is achieved.

Preferably, the laser light source comprises a laser light-emitting diode.

Preferably, the objective lens system comprises an objective cemented lens.

Preferably, the eyepiece system comprises an eyepiece cemented lens and an eyepiece positive lens.

It can be known from the above technical solution that compared with the prior art, the present invention discloses and provides a miniaturized wide-range laser range finder, and has the following beneficial effects:

1. In the present invention, the adjustment of the focal length of the objective lens of the monocular telescopic system is achieved by adding a focus adjusting system to the monocular telescopic system, so that the observing and measuring range of the laser range finder is expanded, making the minimum observing distance of the laser range finder reach 2 meters, and the range of the observing distance of the laser range finder expanded to 2-2000 meters, and observation can be achieved by the laser range finder in a wide range. At the same time, the focus adjusting system is composed of a single focus adjusting negative lens, so that the volume of a laser range finder product is reduced.

2. The monocular telescopic system and the laser receiving system of the present invention share the same objective lens system, focus adjusting system and beam splitting prism group, so that the volume of the laser range finder is reduced and the manufacturing cost is saved.

3. The present invention adopts the design of the cemented prism matching with the roof half penta prism, and the design is ingenious and reasonable, so that the laser range finder is more compact and portable, and the miniaturization of the laser range finder is achieved.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the figures: 1—objective cemented lens; 2—focus adjusting negative lens; 3—cemented prism; 31—isosceles prism; 32—compensating prism; 4—roof half penta prism; 5—LCD (liquid crystal display) unit; 6—eyepiece cemented lens; 7—eyepiece positive lens; 8—emitting lens; 9—laser emitting diode; 10—laser receiver; 11—light filter; 12—receiving lens; a—position of focus adjusting negative lens when observation is made at a distance of 2000 meters; b—position of focus adjusting negative lens when observation is made at a distance of 2 meters; L1—distance between focus adjusting negative lens and objective cemented lens when observation is made at a distance of 2000 meters; L2—distance between focus adjusting negative lens and objective cemented lens when observation is made at a distance of 2 meters.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

The present invention discloses a miniaturized wide-range laser range finder, comprising a monocular telescopic system, a laser emitting system and a laser receiving system, wherein the monocular telescopic system comprises an objective lens system, a focus adjusting system, a beam splitting prism group, a liquid crystal display unit and an eyepiece system through which visible light passes in sequence; the laser emitting system is used for emitting laser, and specifically comprises a laser light source and an emitting lens; the laser receiving system comprises an objective lens system, a focus adjusting system, a beam splitting prism group, a receiving lens, a light filter and a laser receiver through which a laser reflection light signal passes in sequence.

Figure 1:
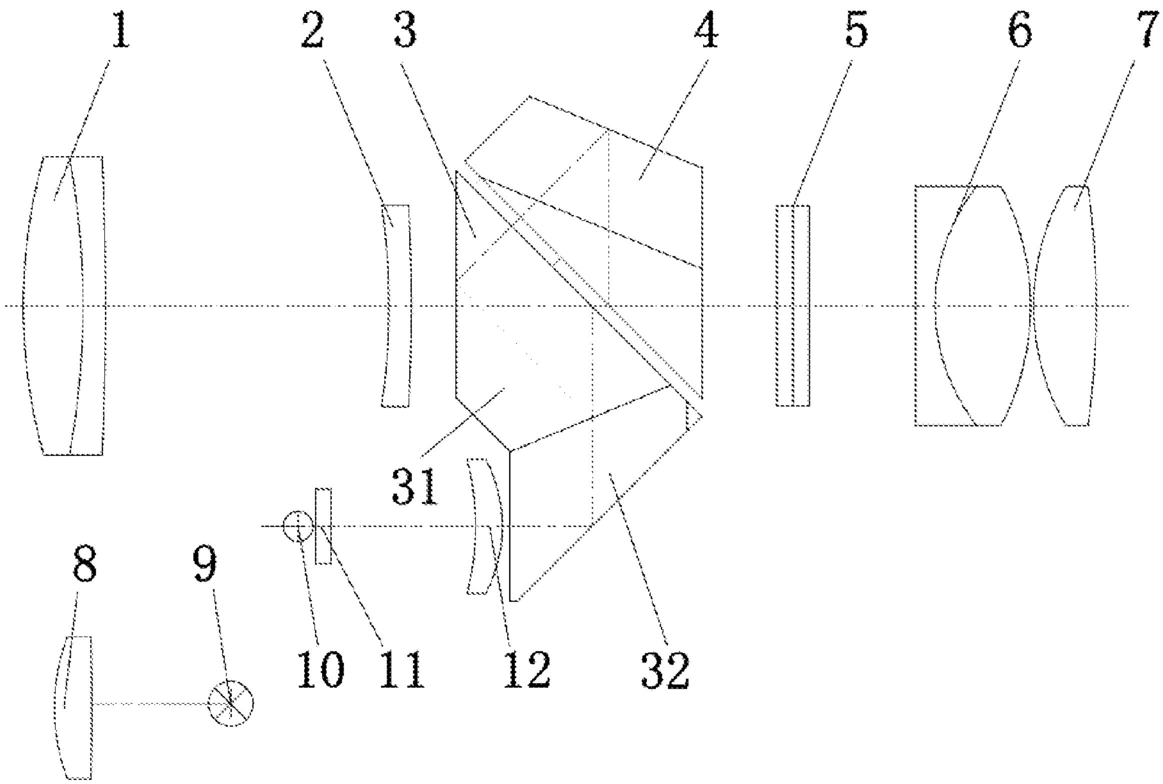
FIG. 1 is a structural schematic diagram of an overall optical system provided in an embodiment of the present invention.

As shown in FIG. 1, as a preferred solution, in an embodiment, the monocular telescopic system comprises an objective lens system composed of an objective cemented lens 1, a focus adjusting system composed of a focus adjusting negative lens 2, a beam splitting prism group composed of a cemented prism 3 and a roof half penta prism 4, a transparent liquid crystal display unit composed of a transparent LCD (liquid crystal display) unit 5, and an eyepiece system composed of an eyepiece cemented lens 6 and an eyepiece positive lens 7;

The laser emitting system used for emitting laser comprises a laser light source composed of a laser light-emitting diode 9 and an emitting lens 8 located in the optical path of the laser light-emitting diode 9;

The laser receiving system comprises the objective cemented lens 1, the focus adjusting negative lens 2, the cemented prism 3 of the beam splitting prism group, a receiving lens 12 and a laser receiver 10 through which a laser reflection light signal passes in sequence.

In this embodiment, the monocular telescopic system and the laser receiving system share the same objective lens system (the objective cemented lens 1), focus adjusting system (the focus adjusting negative lens 2) and beam splitting prism group (the cemented prism 3), so that the volume of the laser range finder is reduced by such a design.

Figure 2:
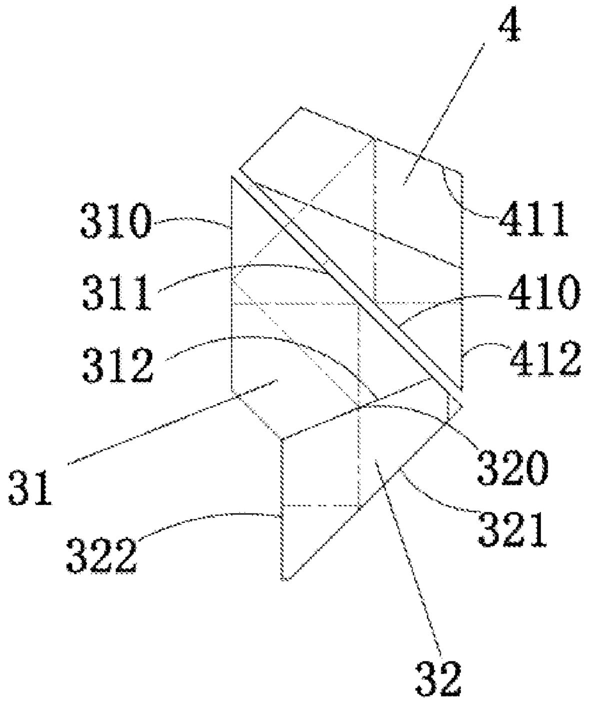
FIG. 2 is a schematic diagram of an optical path of a beam splitting prism group provided in an embodiment of the present invention.

As shown in FIG. 2, in an embodiment, the beam splitting prism group comprises the cemented prism 3 and the roof half penta prism 4, wherein the cemented prism 3 is formed by cementing an isosceles prism 31 and a compensating prism 32, and the isosceles prism 31 is provided with a laser input and reflection surface 310, a reflection and output surface 311, and a first beam splitting surface 312 which are connected in sequence; the compensating prism 32 is provided with a second beam splitting surface 320, a laser reflection surface 321 and a laser output surface 322 which are connected in sequence; the roof half penta prism 4 is provided with a roof light input and reflection surface 410, a roof top surface 411 and a roof light output surface 412, and the laser input surface 310 of the cemented prism is in parallel with the output surface 412 of the roof half penta prism.

The visible light propagation path of the present invention is: visible light passes through the objective cemented lens 1 and the focus adjusting negative lens 2 in sequence, enters the laser input surface 310, and is then reflected by the reflection and output surface 311; the reflected visible light is reflected by the first beam splitting surface 312, passes through the reflection and output surface 311 after being reflected by the laser input and reflection surface 310 again, enters the roof half penta prism 4, and then enters the eyepiece system to achieve the telescopic function; laser passes through the first beam splitting surface 312 and the second beam splitting surface 320 which is overlapped with the first beam splitting surface, and enters the laser receiving system to achieve the range finding function. Through such a prism design, the purpose that the telescopic system and the receiving system share the same objective lens and prisms can be achieved, and the volume of the system is reduced to further achieve the miniaturization of the laser range finder.

The optical paths of the monocular telescopic system and the laser receiving system are respectively described below in detail.

Figure 3:
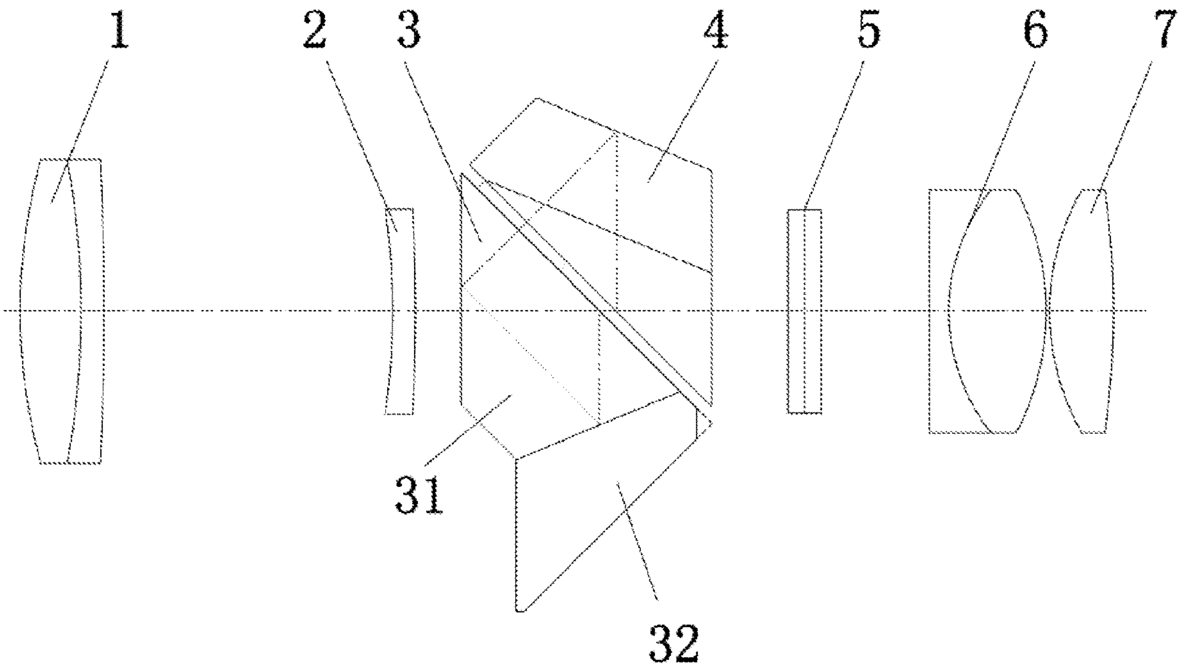
FIG. 3 is a schematic diagram of a visible light optical path of a monocular telescopic system provided in an embodiment of the present invention.

As shown in FIG. 3, visible light enters from the objective cemented lens 1, passes through the focus adjusting negative lens 2, the cemented prism 3, the roof half penta prism 4, the LCD (liquid crystal display) unit 5, the eyepiece cemented lens 6 and eyepiece positive lens 7, and is finally received by human eyes, thus to form the optical path of the monocular telescopic system.

Figure 4:
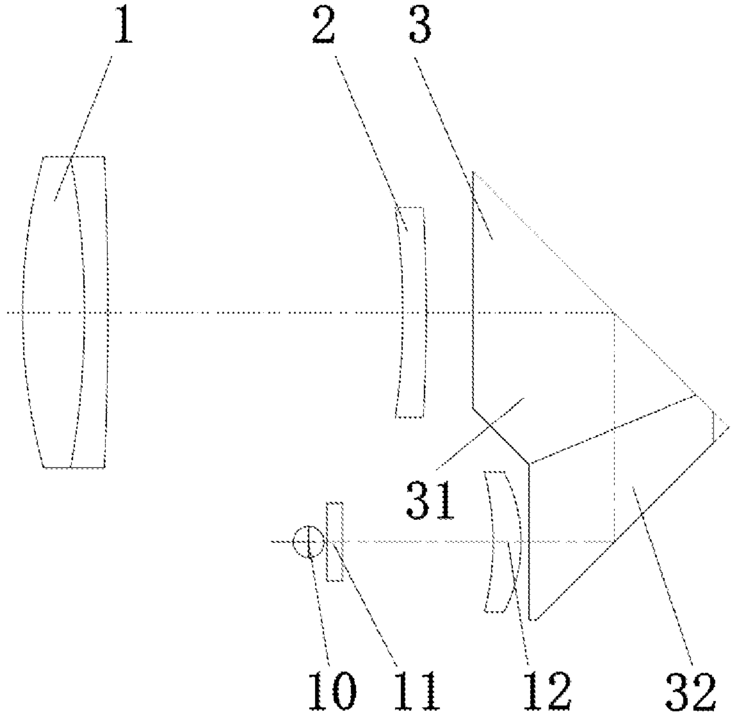
FIG. 4 is a schematic diagram of an optical path of a laser receiving system provided in an embodiment of the present invention.

As shown in FIG. 4, in the laser receiving system, a laser reflection signal of an object to be measured passes through the objective cemented lens 1, the focus adjusting lens 2, the cemented prism 3, the receiving lens 12 and a light filter 11, and is finally received by the laser receiver 10.

The optical path design principles of the laser emitting system and the laser receiving system in the present invention are the same, so that the function of laser emitting can also be achieved when the laser light-emitting diode is placed at the position of the laser receiver; the function of laser receiving can also be achieved when the laser receiver is placed at the position of the laser light-emitting diode; therefore, in other embodiments, the laser light-emitting diode and the laser receiver are interchangeable in position.

The range finding process of the present invention is: the object to be measured can be observed by the monocular telescopic system, laser is emitted by the laser light-emitting diode 9 of the laser emitting system and is emitted out after passing through the emitting lens 8, a light signal is reflected after the laser reaches the object to be measured, the reflected light signal is received by the laser receiving system, the distance of the object to be measured is calculated by circuit and software processing according to the signal time difference between laser emitting and laser receiving, and the distance information is displayed on the LCD (liquid crystal display) unit 5.

The focus adjusting negative lens of the monocular telescopic system can be moved forward and backward along the optical axis of the monocular telescopic system. According to the Gaussian formula (1/image distance+1/object distance=1/focal length) of optical imaging, in a telescopic objective lens system with a fixed focal length, the image distance when observation is made at a distance of 2 meters is greater than that when observation is made at a distance of 2000 meters, and the focal planes are not in the same position. After the focus adjusting negative lens is added, the focus adjusting lens is moved along the optical axis of a monocular telescope to change the focal length, so that the object to be measured can be clearly imaged both at a distance of 2 meters (short distance) and at a distance of 2000 meters (long distance), and both the object to be measured and the LCD liquid crystal display information can be seen clearly through an eyepiece. By such a design, both the length of the telescope in the monocular telescopic system and the volume of the product can be reduced, making the objective lens system of the laser range finder more miniaturized.

Figure 5:
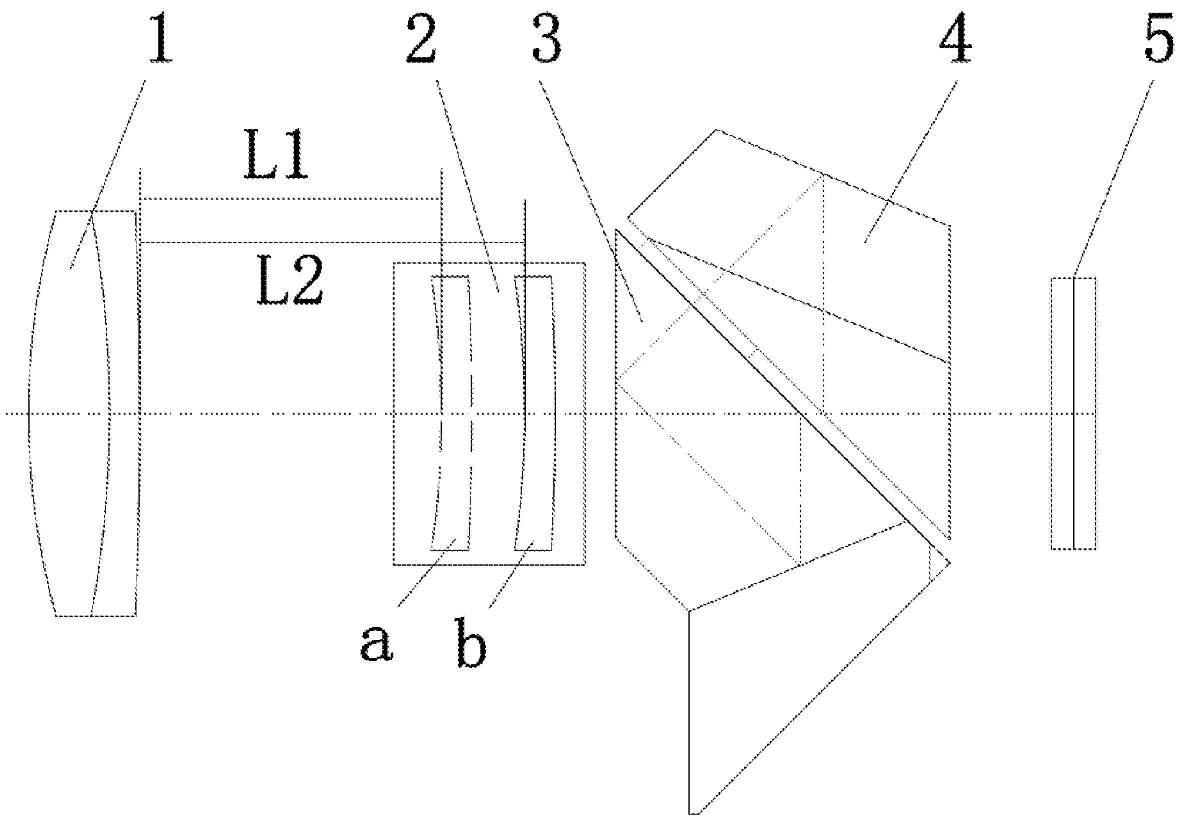
FIG. 5 is a schematic diagram of an optical path of a focus adjusting system provided in an embodiment of the present invention.

As shown in FIG. 5, in the focus adjusting system, the objective cemented lens 1 is used as a focusing module, and the main function thereof is to gather light and perform imaging; the focus adjusting negative lens 2 is used as a focus adjusting module, and the main function thereof is to change the position of the focal plane. When the positions of all lenses except the focus adjusting negative lens 2 are fixed, the focal planes of the range finder when used for observing objects at a distance of 2 meters and a distance of 2000 meters can be kept in the same position of the system by moving the focus adjusting module. The focus adjusting module is moved forward and backward along the optical axis of the telescope, and the distances L1 and L2 between the focusing module and the focus adjusting module make the total lengths of the system equal when observations are made at a distance of 2000 meters and a distance of 2 meters. In FIG. 5, Position a is the position of the focus adjusting lens when observation is made at a distance of 2000 meters, and at this time, the distance between the objective lens and the focus adjusting negative lens is L2; Position b is the position of the focus adjusting lens when observation is made at a distance of 2 meters, and at this time, the distance between the objective lens and the focus adjusting negative lens is L1. In the two cases, the focal planes are in the same position, the total lengths of the system are equal, and observation can be achieved by the laser range finder in a wide range from 2 meters to 2000 meters.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A miniaturized wide-range laser range finder, comprising a monocular telescopic system, a laser emitting system and a laser receiving system, wherein the monocular telescopic system comprises an objective lens system, a focus adjusting system, a cemented prism, a roof half penta prism, a transparent liquid crystal display unit and an eyepiece system through which visible light passes in sequence; the laser emitting system comprises a laser light source and an emitting lens; the laser receiving system comprises the objective lens system, the focus adjusting system, the cemented prism, a receiving lens, a light filter and a laser receiver through which a laser reflection light signal passes in sequence, wherein the cemented prism and the roof half penta prism constitute a beam splitting prism group, the cemented prism comprises an isosceles prism and a compensating prism, and the isosceles prism comprises a laser input surface, a reflection and output surface, and a first beam splitting surface which are connected in sequence; the compensating prism comprises a second beam splitting surface, a laser reflection surface and a laser output surface which are connected in sequence; and the first beam splitting surface of the isosceles prism is overlapped with the second beam splitting surface of the compensating prism;

the roof half penta prism comprises a roof light input and reflection surface, a roof top surface and a roof light output surface; and the laser input surface of the isosceles prism is arranged in parallel with the roof light output surface of the roof half penta prism.

2. The laser range finder according to claim 1, wherein the focus adjusting system comprises a focus adjusting negative lens which is located between the objective lens system and the beam splitting prism group, and moved forward and backward along the optical axis direction of the monocular telescopic system.

3. The laser range finder according to claim 1, wherein the monocular telescopic system and the laser receiving system share the same objective lens system, focus adjusting system and beam splitting prism group.

4. The laser range finder according to claim 1, wherein the transparent liquid crystal display unit is located in the focal plane of the eyepiece system.

5. The laser range finder according to claim 1, wherein the laser light source comprises a laser light-emitting diode.

6. The laser range finder according to claim 1, wherein the objective lens system comprises an objective cemented lens.

7. The laser range finder according to claim 1, wherein the eyepiece system comprises an eyepiece cemented lens and an eyepiece positive lens.

* * * * *